(12) United States Patent
Brown et al.

(10) Patent No.: US 6,873,851 B2
(45) Date of Patent: Mar. 29, 2005

(54) METHOD, SYSTEM, AND PROGRAM FOR PROVIDING USER LOCATION INFORMATION FOR A PERSONAL INFORMATION MANAGEMENT SYSTEM FROM TRANSMITTING DEVICES

(75) Inventors: Michael Wayne Brown, Georgetown, TX (US); Rabindranath Dutta, Austin, TX (US); Michael A. Paolini, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 582 days.

(21) Appl. No.: 09/848,173

(22) Filed: May 3, 2001

(65) Prior Publication Data

US 2002/0164995 A1 Nov. 7, 2002

(51) Int. Cl.[7] .................................................. H04Q 7/20
(52) U.S. Cl. ........................... 455/456.3; 455/456.1; 455/456.2
(58) Field of Search ........................ 455/456.1, 456.2, 455/456.3, 456.6, 414.1, 414.2; 707/101, 100, 3, 6, 10; 705/8, 9

(56) References Cited

U.S. PATENT DOCUMENTS

| | | | |
|---|---|---|---|
| 5,124,912 A | | 6/1992 | Hotaling et al. |
| 5,416,473 A | | 5/1995 | Dulaney, III |
| 5,428,784 A | | 6/1995 | Cahill, Jr. |
| 5,579,535 A | * | 11/1996 | Orlen et al. ................ 455/421 |
| 5,664,063 A | | 9/1997 | Johnson et al. |
| 5,664,175 A | | 9/1997 | Jackson et al. |
| 5,774,873 A | | 6/1998 | Berent et al. |
| 5,790,974 A | | 8/1998 | Tognazzini |
| 5,832,489 A | | 11/1998 | Kucala |
| 5,835,896 A | | 11/1998 | Fisher et al. |
| 5,881,231 A | * | 3/1999 | Takagi et al. ................ 709/212 |
| 5,890,138 A | | 3/1999 | Godin et al. |
| 5,918,158 A | | 6/1999 | LaPorta et al. |
| 6,047,260 A | | 4/2000 | Levinson |

(Continued)

FOREIGN PATENT DOCUMENTS

| | | |
|---|---|---|
| EP | 0495622 | 1/1992 |
| EP | 0637807 | 7/1994 |
| EP | 0834840 | 9/1997 |
| EP | 1039397 | 9/2000 |
| WO | 0029979 | 5/2000 |

OTHER PUBLICATIONS

U.S. Appl. No. 09/848,176, filed on May 3, 2001, entitled "Method, System and Program for Mining Data in a Personal Information Manager Database," by M. Paolini, et al.
Mueller, Erik T., "A Calender with Common Sense", © 2000 ACM, pp. 198–201.

(Continued)

*Primary Examiner*—Jean Gelin
(74) *Attorney, Agent, or Firm*—David W. Victor; Konrad Raynes & Victor LLP

(57) ABSTRACT

Provided is a method, system, and program for providing user location information for a personal information management program. A plurality of records for a user of a wireless device each include at least one position coordinate and an associated time indicating a location of the wireless device at the time and the position coordinate. Records for transmitting devices each include at least one position coordinate and an associated location description providing information on the position coordinate in the records. The location description from at least one of the transmitting device records is added to at least one record associated with the user of the wireless unit.

33 Claims, 12 Drawing Sheets

U.S. PATENT DOCUMENTS

| | | | |
|---|---|---|---|
| 6,085,166 A | | 7/2000 | Beckhardt et al. |
| 6,101,480 A | | 8/2000 | Conmy et al. |
| 6,144,971 A | * | 11/2000 | Sunderman et al. ........ 715/500 |
| 6,154,172 A | | 11/2000 | Piccionelli et al. |
| 6,363,323 B1 | * | 3/2002 | Jones ......................... 701/213 |
| 6,415,155 B1 | * | 7/2002 | Koshima et al. ......... 455/456.1 |
| 6,529,159 B1 | * | 3/2003 | Fan et al. .............. 342/357.09 |

OTHER PUBLICATIONS

Schwartz, Ephraim, "Cellular Phone Giants to Integrate Sirf's GPS Technology", Aug. 10, 1998 [online], Retrieved from the Internet <URL: www.infoworld.com./cgi-bin/displayStory.pl?980810.ehe911.htm>.

"allNetDevices:—The Wireless Internet: Applications, Technology and Market Strategies", Jan. 10, 2001, pp. 1–4 [online]. Retrieved from the Internet <URL: www.allnetdevices.com/icom_cgi/print/print.cgi?url=http://www.allnetdevices.com/wireless/opinions/2001 . . .>.

"allNet Devices: —Java 2 Micro Edition and the Mobile Information Device Profile", Feb. 16, 2001, pp. 1–7 [online]. Retrieved from the internet <URL: www.allnetdevices.com/icom_cgi/print/print.cgi?url=http://www.allnetdevices.com/developer/tutorials/2001 . . . >.

Software Patent Institute Database of Software Technologies, Record Display, Record 4, Serial number TDB1192.0038. Retrieved from the Internet <URL: http://m.spi.org/cgi-bin/newqry?ISA=Hit . . . 000&rec=4&submit=seeit&csum=17256401631>.

Software Patent Institute Database of Software Technologies, Record Display, Record 6, Serial number TDB1192.0045. Retrieved from the Internet <URL: http://m.spi.org/cgi-bin/newqry?ISA=Hit . . . 000&rec=4&submit=seeit&csum=17950330939>.

"allNetDevices:—Wearable Transmeta Device Planned", Nov. 14, 2000 [online]. Retrieved from the Internet <URL: www.allnetdevices.com/icom_cgi/print/print.cgi?url=http://www.allnetdevices.com/wireless/news/2001 . . . >.

"allNetDevices:—Any Content, Any Device, Anyplace", Feb. 16, 2001[online]. Retrieved from the Internet <URL: www.allnetdevices.com/icom_cgi/print/print.cgi?url=http://www.allnetdevices.com/wireless/news/2001 . . . >.

U.S. Appl. No. 09/848,166, filed May 3, 2001, entitled "Method System and Program for Providing User Location Information with a Personal Information Management Program," by MW Brown; R Dutta and MA Paolini.

Patent Cooperation Treaty (PCT) International Search Report, Jan. 29, 2003, for International Application No. PCT/GB02/02020.

Beadle, H.W., et al. "*Using Location and Environment Awareness in Mobile Communications.*" International Conference on Information, Communications and Signal Processing. ICICS. Singapore 9–12 Sep., 1997, pp. 1781–1785. New York, NY, USA, IEEE.

Manandhar, Sanjay. "*Activity Server: You Can Run but You Can't Hide.*" Proceedings of the Summer Usenix Conference Proceedings, pp. 299–311, 10–14 Jun., 1991, Nashville, TN, US (1991) Berkeley, CA, US.

Want, R. et al. "*The Active Badge Location System.*" ACM Transactions on Information Systems 10 (1992), pp. 91–102, Jan., No. 1, New York, US.

Hancock, Bill. "*Wireless Big Brother.*" Computers and Security. International Journal Devoted to the Study of Technical and Financial Aspects of Computer Security, Elsevier Science Publishers, vol. 19, No. 8, Dec. 1, 2000, pp. 667–668. Amsterdam, NL.

Rhodes, Bradley J. "*The Wearable Remembrance Agent: a System for Augmented Memory.*" Wearable Computers, 1997. Digest of Papers. First International Symposium on Cambridge, MA, USA, pp. 123–128.

Patent Cooperation Treaty (PCT) International Search Report, for International Application No. PCT/GB 02/02051, Search completed on May 9, 2003.

* cited by examiner

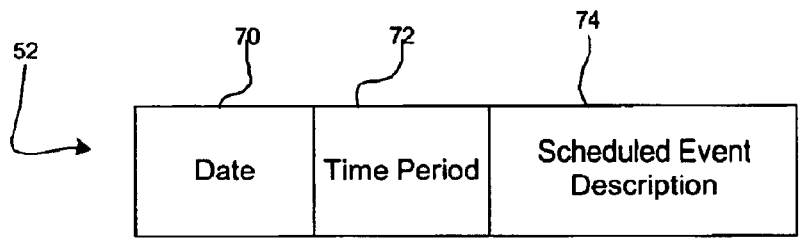
FIG. 3a — Scheduled Event Record
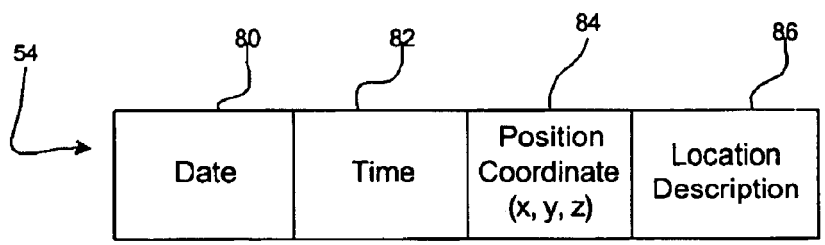
FIG. 3b — Measured Position Record
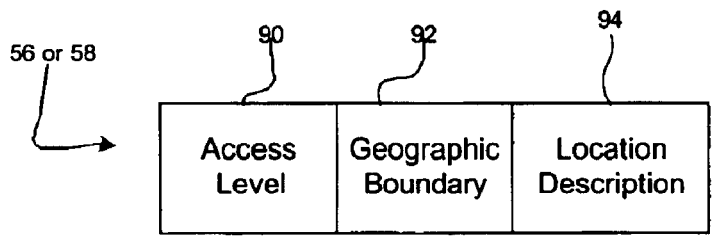
FIG. 3c — Location Record
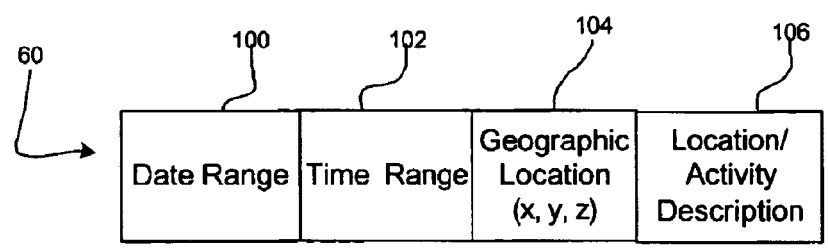
FIG. 3d — Filtered Position Record

FIG. 8

Calendar    February 5, 2001

Monday, February 5th, 3:30PM

| Time | Scheduled Event | Actual Activity |
|---|---|---|
| 8:00 AM | Arrive at Work | At Home |
| 9:00 | Work at desk | In office |
| 10:00 | | |
| 11:00 | | |
| 12:00 | Lunch at Dennys | In office |
| 1:00 | Meeting w/ office team | In meeting room |
| 2:00 | | In office |
| 3:00 | | In office |
| 4:00 | | In office |
| 5:00 | Family Dinner | In office |

April 2001

| S | M | T | W | T | F | S |
|---|---|---|---|---|---|---|
| 1 | 2 | 3 | 4 | 5 | 6 | 7 |
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | | | | | |

March 2001

| S | M | T | W | T | F | S |
|---|---|---|---|---|---|---|
| 1 | 2 | 3 | 4 | 5 | 6 | 7 |
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | | | 29 | 30 | 31 |

Measured Position Record

METHOD, SYSTEM, AND PROGRAM FOR PROVIDING USER LOCATION INFORMATION FOR A PERSONAL INFORMATION MANAGEMENT SYSTEM FROM TRANSMITTING DEVICES

CROSS-REFERENCE TO RELATED APPLICATIONS

This application is related to the following co-pending and commonly-assigned patent applications filed on the same date herewith, and which are incorporated incorporated herein by reference in their entirety:

"Method, System, and Program for Providing User Location Information with a Personal Information Management Program", having Ser. No. 09/848,166; and "Method, System, and Program for Mining Data in A Personal Information Manager Database", having Ser. No. 09/895,244.

BACKGROUND OF THE INVENTION

1. Field of the Invention

The present invention relates to a method, system, and program for providing user location information for a personal information management program from transmitting devices.

2. Description of the Related Art

Portable computing devices, such as hand held computers, cellular phones, palm devices, etc., have become increasingly popular in recent years. The technology has advanced to such a degree that now people can access the Internet through wireless technology, such as a cellular phone or personal digital assistant (PDA), and review content especially tailored for a small portable device. The term PDA, as used herein, refers to any wireless, portable, and small hand held computer device, such as a palm computer, cellular phone, wearable computers, etc. Some of the most popular mobile applications for such wireless devices have included personal information managers (PIMs), entertainment programs, financial services, and mobile commerce.

One of the recent technological developments for mobile Internet access is the Wireless Application Protocol (WAP), which allows mobile devices to use data services and access the Internet. WAP provides a client/server architecture. A WAP enabled client, such as a cell phone or palm computer, can use micro browsers which are designed to operate within the small display screen of mobile devices and use less memory than a desktop browser. Content for mobile WAP enabled devices may be written in the Wireless Markup Language (WML), which provides a tagged mark-up language similar to the hypertext markup language (HTML), but designed specifically to function in a small-screen environment. Many content providers are providing WAP pages to enable access to the large base of mobile phone and PDA users.

Notwithstanding, recent developments in wireless computing, such as more advanced PIMs, Internet browsing and e-commerce features, only provide users with a significantly limited version of the programs and functions that are available at a desktop computer. For instance, a desktop PIM or calendar program provides a substantially more robust display presentation and range of program functionality than is available for mobile wireless device PIM applications. The same is true for Internet browsing. Given the substantial advantages of desktop PIM and Internet access programs over those available for mobile devices, most computer users, except the submarket of frequent business travelers, may not be motivated to purchase wireless devices for uses other than as a mobile telephone and limited PIM, e.g., address book, calendar, to do list, etc.

Thus, there is a need in the art for an application that would more fully exploit wireless computing technology to extend the utility beyond that of a portable telephone and limited PIM.

SUMMARY OF THE PREFERRED EMBODIMENTS

Provided is a method, system, and program for providing user location information for a personal information management program. A plurality of records for a user of a wireless device each include at least one position coordinate and an associated time indicating a location of the wireless device at the time and the position coordinate. Records for transmitting devices each include at least one position coordinate and an associated location description providing information on the position coordinate in the records. The location description from at least one of the transmitting device records is added to at least one record associated with the user of the wireless unit.

Further, a determination is made of one transmitting device record including one position coordinate that is within a proximity to one position coordinate in one user record. The location description from the determined transmitting device record is added to the user record having the position coordinate within the proximity to the position coordinate of the determined transmitting device record.

Still further, the user records may include a list identifying one or more transmitting devices within a proximity to the wireless unit of the user. In such case, the added location description may be supplied from one record for one transmitting device identified in the list.

The described implementations provide a technique for providing location information for user records in a personal information manager (PIM) that is obtained from other transmitting devices in proximity to the entity, e.g., person with a wireless device, associated with the user records. In this way, the personal information management program information for a user is supplemented with location description information indicating the location of the user at a point in time. The described implementations further provide a tool to allow people to review their actual activity and movement and compare with planned goals or scheduled events. Such information will enable people and organizations to more optimally allocate their time to accomplish both personal and business goals.

BRIEF DESCRIPTION OF THE DRAWINGS

Referring now to the drawings in which like reference numbers represents corresponding parts throughout:

FIGS. 3a, b, c, d illustrate data structures used in accordance with implementations of the present invention;

FIGS. 8, 9a, and 9b illustrate examples of a display of user calendar and generated location information in accordance with implementations of the present invention.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
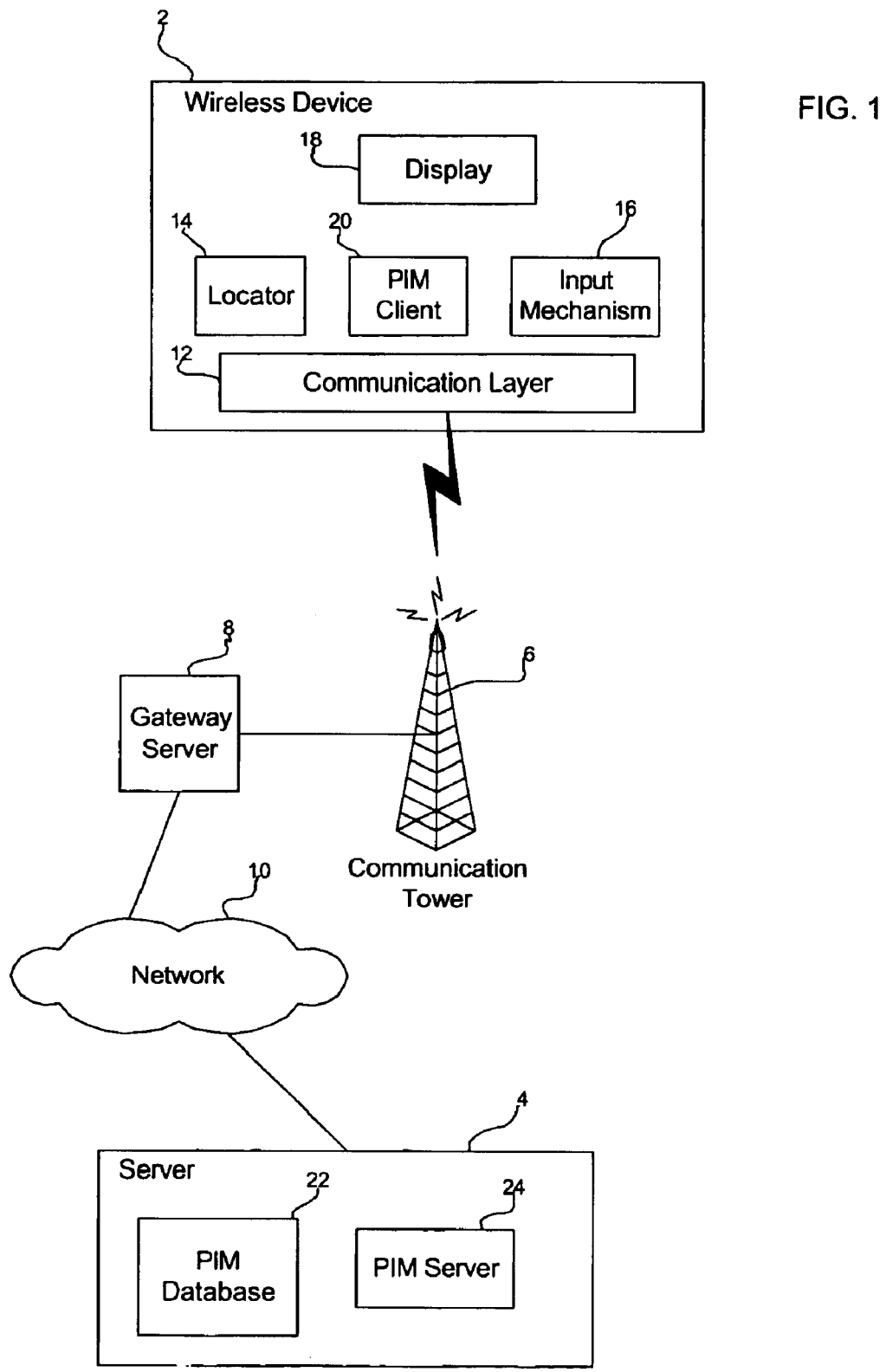
FIG. 1 illustrates a telecommunication environment in which aspects of the invention are implemented.

FIG. 1 illustrates a wireless computing environment in which embodiments of the invention are implemented. A wireless device 2, such as a telephony device, e.g., cellular phone, personal digital assistant (PDA), hand held computer, palm computer, etc., communicates with a server 4 via a communication tower 6, gateway server 8, and network 10. The server 4 may comprise one or more server class machines known in the art. The wireless device 2 includes a communication layer 12 which converts digital data into a signal that is transmitted to the communication tower 6 in a manner known in the art. The gateway server 8 converts the signals back into digital data to transmit via network 10 to the server 4. The network 10 may comprise any collection of devices, routers, etc. used to transmit data to a centralized server 4 providing data management for the wireless device 2 operations. The communication tower 6 and communication layer 12 may implement any known wireless transmission technology known in the art, such as 3G, Code-Division Multiple Access (CDMA), Global System for Mobile Communications (GSM), satellite, Bluetooth, etc.**

**Bluetooth is a trademark of Telefonaktiebolaget LM Ericsson.

The wireless device 2 further includes locator technology 14 that provides a current position coordinate of the wireless device 2 in three dimensional space (x, y, z) on the surface of the earth and the time the position coordinate was generated. The locator 14 may comprise a global position satellite (GPS) receiver that is capable of calculating a current position based upon signals sent from satellites in a manner known in the art. Alternatively, the location of the wireless device 2 can be estimated externally from the wireless device by measuring the transmissions from the wireless device 2 using any known location positioning technology in a manner known in the art, such as Enhanced Observed Time Differential (E-OTD), Time Of Arrival (TOA), the CellPoint positioning system, the Ericsson Mobile Positioning System, etc.** In fact the United States Federal Communication Commission (FCC) mandated that cellular phone manufacturers incorporate technology to allow the location of the wireless device 2 to be determined. Any reference to the locator 14 refers to the locator technology used within the wireless device 2 that enables a position determination. For instance, if the locator 14 comprises a GPS receiver, then the locator 14 itself may determine the actual position coordinate. Alternatively, the locator 14 may provide information to an external component to enable the external component to determine the position coordinate of the wireless device 2.

**Bluetooth is a trademark of Telefonaktiebolaget LM Ericsson.

The wireless device 2 further includes an input mechanism 16 for entering any type of data, including text, voice data, audio, images, movies, etc. The input mechanism 16 may include any known data input system known in the art, including a keyboard embedded in the device 2 with depressable keys, a touch sensitive displayed keyboard, a microphone for providing audio input, voice recognition software, still image camera, video recorder, pen-stylus text input system including handwriting recognition software, etc. Data entered by the user through the input mechanism 16 or downloaded from the server 4 can be rendered in display 18, which may comprise any electronic display device known in the art. A Personal Information Manager (PIM) client 20 gathers and presents PIM information, such as calendering and scheduling information, in accordance with the described implementations. The term "PIM" as used herein refers to a program designed to allow users to organize random bits of information in a useful format. The PIM program may enable calendar or scheduler operations. A calendar program enables one or more users to record and organize events and appointments. A scheduler program enables a group of colleagues to schedule meetings and other appointments, and share schedule and calendar information. Further, the PIM may be intended for use by a single individual for personal information or for use by a company or organization to provide information related to that persons involvement with the company or organization. The use of the term PIM or PIM program herein refers to any program that includes some or all of the above described calendar or scheduler functions, or any other functions those skilled in the art associate with PIMs.

The server 4 includes a PIM database 22 maintaining user PIM information and a PIM server 24 for gathering and filtering data from wireless devices 2 for the users of the system. The PIM database 22 may be implemented using any database technology known in the art, e.g., relational database, object oriented database, etc. Although FIG. 1 only shows one wireless devices 2, the server 4 and PIM database 22 may maintain data for multiple wireless devices 2 and users.

In the described implementations, the PIM client 20 gathers position coordinates for the PIM server 24. The PIM server 24 then uses the position coordinates to supplement the user calendar records with information on what the user actually did for time periods within a day. The user could then view this enhanced calender including listings of scheduled appointments as well as information describing the actual location and activities of the user and descriptions thereof. The term "location" and "geographic location" as used herein refer to any location that may be mapped and ascertained. Such location or geographic location may be any location on the surface of the earth or the earth's atmosphere, or outer space, that can be expressed as a position coordinate in space. The term "location" or "geographic location" may refer to a specific position coordinate in space, e.g., an X, Y, Z coordinate, or a boundary or area of coordinates. Additionally, the location may be expressed as a vector. The term "position coordinate" as used herein refers to any of a set of numbers used in specifying the location of a point in space, or any one of a set of variables used in specifying the state or motion of an entity, such as a wireless unit or person, associated with the position coordinate.

The PIM server 24 includes the program logic that responds to data requests from PIM clients 20, accesses the PIM database 22 to perform database operations, and performs other data management operations related to managing the PIM database 22. The PIM server 24 may include a database management system (DBMS) known in the art or include an interface to access a DBMS program in a manner known in the art to perform operations with respect to the PIM database 22. The PIM server 24 may implement any database programming techniques for performing operations in the PIM database 22. For instance, the PIM server 24 may implement separate application programs for performing database operations or implement database stored procedures to perform database operations. The PIM client 20 includes those program components that gather coordinate and location information as described herein, communicates with the PIM server 24, and renders calendaring information at the wireless device 2.

Figure 2:
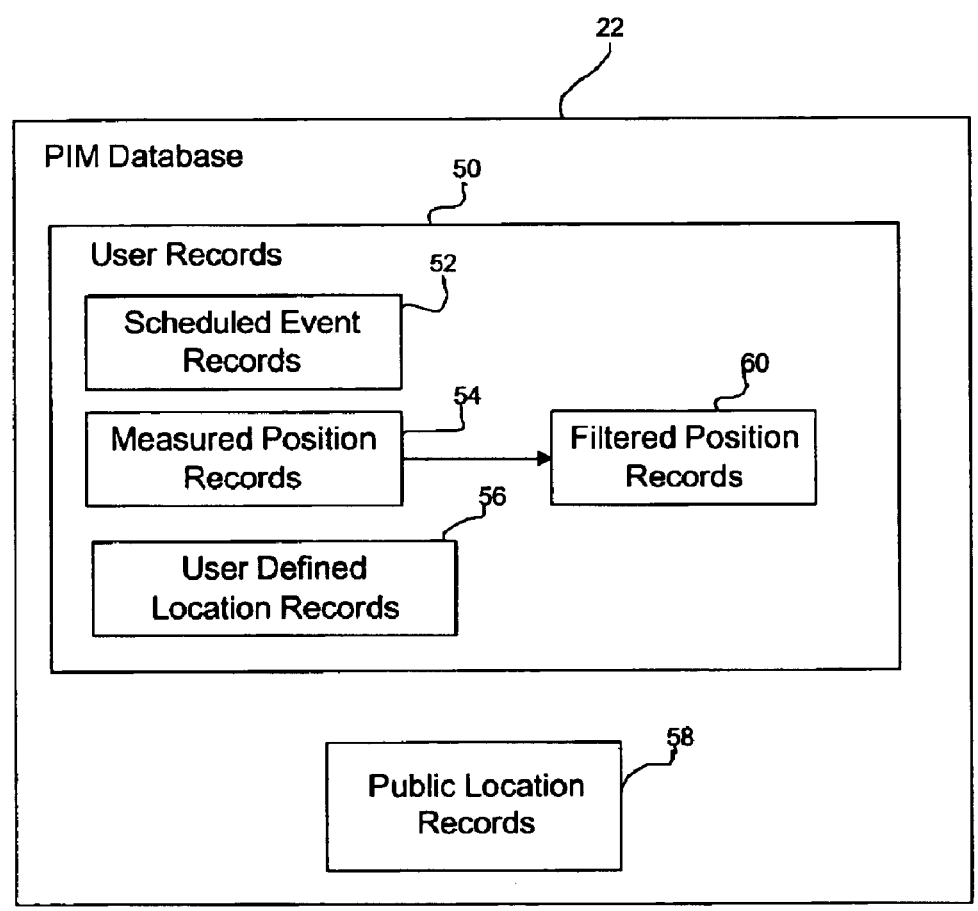
FIG. 2 illustrates components of a PIM database in accordance with implementations of the present invention.

FIG. 2 illustrates the data components of the PIM database 22 maintained by the server 4. The PIM database 22 includes a plurality of user records 50 for each user of a wireless device 2 participating in the wireless computing environment described herein. Each user record 50 includes one or more user scheduled event records 52, measured position records 54, and location records 56 and 58. From the measured position records 54, the PIM server 24 generates filtered position records 60 that provide information on user geographic location and activity for time periods, such as information for a period of fifteen minutes, twenty minutes, one hour, etc.

FIG. 3a illustrates fields in a user scheduled event record 52, including a date 70, time period 72 indicating a time range of the event, and a scheduled event description 74 providing information on the nature of the scheduled event. Through the client PIM 20 software, a user could use the input mechanism 16 to schedule a calendar event and create a scheduled event record 52. Additionally, the user could enter scheduled events from a desktop computer (not shown) that communicates with the server 4 via a network such as the Internet. The scheduled events may be shown in a calendar rendered on the display 18. Additionally, the scheduled events may be shown in a calendar rendered on another computer capable of accessing the server user records 50 in the server 4, such as a desktop computer communicating with the server 4 over the Internet.

FIG. 3b illustrates fields in a measured positioned record 54 for a user, including a date 80 and time 82 the position was measured, a position coordinate 84 expressed as a unique three dimensional x, y, z geographic coordinate on the surface of the earth, and a location description 86 providing descriptive information on the location. In the described implementations, the PIM client 20 periodically generates a measured position record 54 by obtaining the measured position coordinate (x, y, z) and the current time from the locator 14 (which may, in certain implementation interact with external components to provide the location and position coordinate). The location description 86 may be obtained locally at the wireless device 2 or determined subsequently by the server 4 as described in the following implementations.

FIG. 3c illustrates the fields maintained in the user defined 56 and public 58 location records. An access level field 90 indicates which users can be allowed to use the location record 56 or 58 to determine information about a location. The public location record 58 has public level access such that the PIM server 24 can consider a public location record 58 for any user in the PIM database 22. A user location record 56 can only be considered for the particular user that defined the location record 58 and any other authorized users in the system, as indicated by the access level 90. A geographic boundary field 92 defines a boundary of a defined region in three dimensional space. A location description field 94 provides a description of the location, which may include text, images, sound, movies, etc. A company maintaining the server 4, such as a telecommunication service provider, can use satellite maps and other information to determine the geographic boundaries in three dimensional space of various buildings and businesses. Business could register their geographic boundaries. Public location records 58 may then be generated for each of these determined geographic boundaries and include a description of the location within the geographic boundary.

The user specified location records 56 are generated by the user to provide information to include with the user's calendar. For instance, the user may obtain from a third party, such as a mapping company or organization, the geographic boundaries of an office or building and provide geographic boundary and location description information to the server 4 to include in a user location record 56. In another implementation, the user can activate a geographic boundary definition mode on the wireless device 2 to record position coordinates of a geographic boundary using the locator 14. In this geographic boundary definition mode, the user may walk or otherwise travel around a geographic area While moving through the geographic area, the wireless device 2 would determine the x, y, z position coordinates at frequent intervals using the locator 14. The PIM client 20 or PIM server 24 can then use the determined position coordinates to determine a geographic boundary bounding all of the coordinates generated in the geographic boundary definition mode. This determined geographic boundary would then be included in the geographic boundary field 92 of the eventual user defined location record 56 stored in the user records 50 in the database 22. The user may further use the input mechanism 16 to enter information to include in the location description field 94 and the access level 90. The user access level 90 may specify that the user location record 68 be accessible to the user and other specified users, thereby limiting access of the location record 56 to a user defined group.

FIG. 3d illustrates a filtered position record 60 generated from a range of consecutive position records 54 having a same location description 86. The date range 100 and time range 102 for the generated filtered position record 60 would comprise the first and last dates 80 and times 82 of the consecutive position records 64 having the same location description 86. In this way, a single filtered position record 60 represents the data in multiple consecutive position records 54 having a same location description 106. Alternatively, a filtered position record 60 can consolidate multiple position records 54 that have position coordinates 84 within a predetermined proximity, without consideration of the location description 86. A geographic location field 104 indicates the common geographic location of the position records 60 having the same location description 86, which could include the geographic boundary from a location record 56 or 58 if the location description 86 of the consolidated position records 60 was determined from a location record 56 or 58.

Additionally, if algorithms in the PIM server 24 determine that a range of measured position records 54 define an activity, e.g., driving, walking, flying in an airplane, etc., then a filtered position record 60 would be generated for those position records 54 defining the activity. The date range 100 and time range 102 for the generated filtered position record 60 would comprise the first and last date 80 and time 82 of the consecutive position records 64 defining an activity and the location/activity description 106 field for this filtered position record 60 would include a description of the determined activity.

Figure 4:
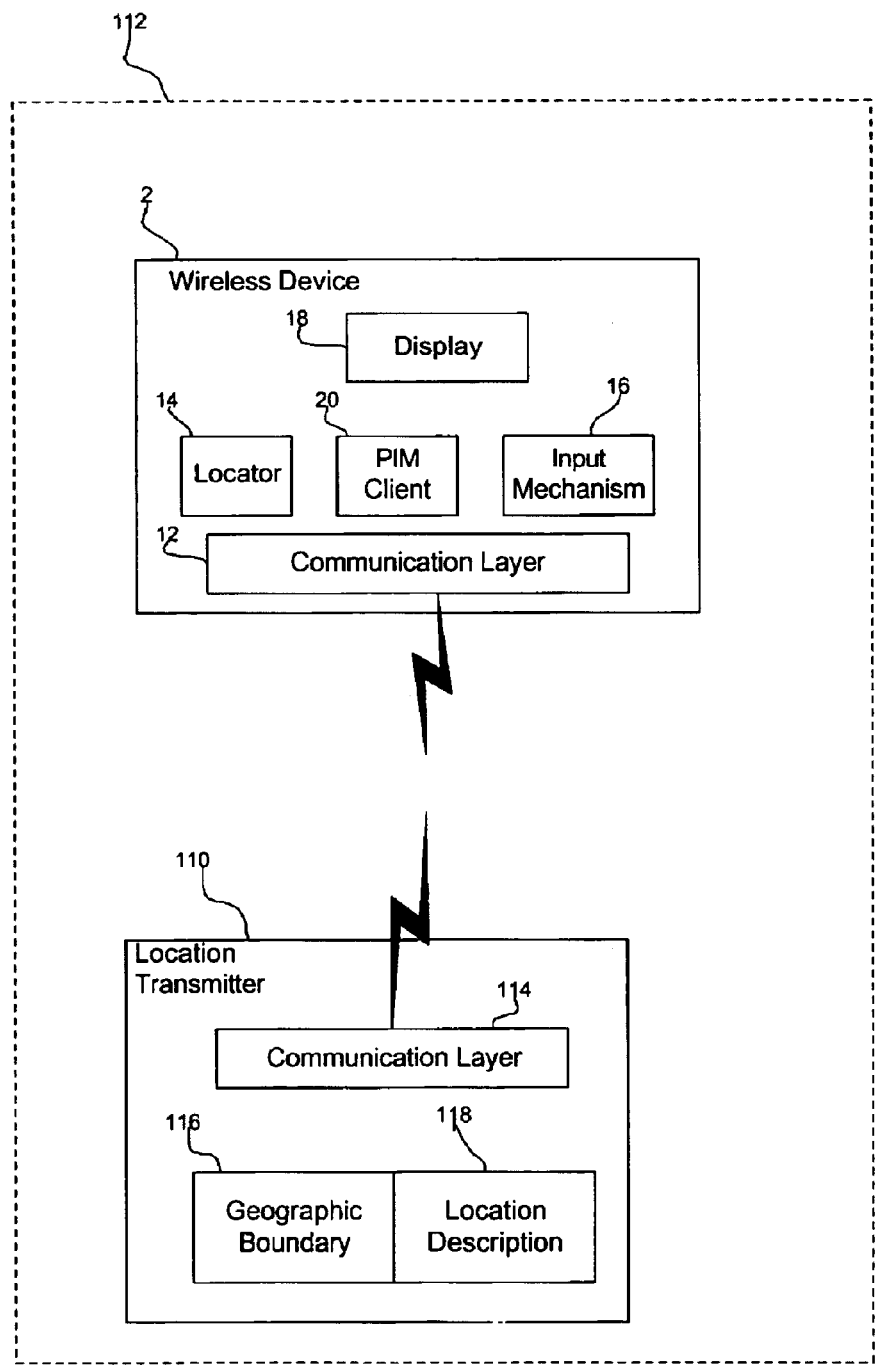
FIG. 4 illustrates further details of the telecommunication environment in which aspects of the invention are implemented.

FIG. 4 illustrates an additional implementation of the telecommunication environment for obtaining geographic boundary information. A location transmitter 110 is maintained in a geographic location or boundary 112, such as an office, building, designated region, etc., and includes a communication layer 114 to transmit data throughout the geographic location 112. For larger geographic locations, multiple location transmitters 110 may be deployed to transmit throughout the entire geographic location 112. The location transmitter 110 maintains a geographical boundary 116, defining a region of x, y, z coordinates, and a location description 118 providing descriptive information on the geographic boundary 112. The local transmitter 110 is capable of transmitting the geographic boundary 116 and location description 118 through the communication layer 114 to any receiving device within the geographic boundary 102. For instance, the communication layers 12 and 114 of the wireless device 2 and location transmitter 110, respectively, may implement Bluetooth technology. In such Bluetooth implementations, the location transmitter 110 may continually transmit packets containing an Inquiry Access Code (IAC) to establish communication with any wireless devices 2 within the geographic boundary 112. The wireless device 2 may then respond to establish a connection with the local transmitter 110. Upon establishing the connection, the local transmitter 110 may then transmit the geographic boundary 116 and location description 118 through communication layer 114 to the communication layer 12 of the wireless device 2. Further details of Bluetooth communication technology are described in the publication "Bluetooth™: Connect Without Cables"by Jennifer Bray and Charles F. Sturnan (Copyright 2001, Prentice Hall), which publication is incorporated herein by reference in its entirety. In alternative implementations, the communication layers 12 and 114 may utilize wireless communication protocols other than Bluetooth known in the art to perform the communication operations described herein, such as the wireless LAN architecture standard proposed in IEEE 802.11.

Figure 5:
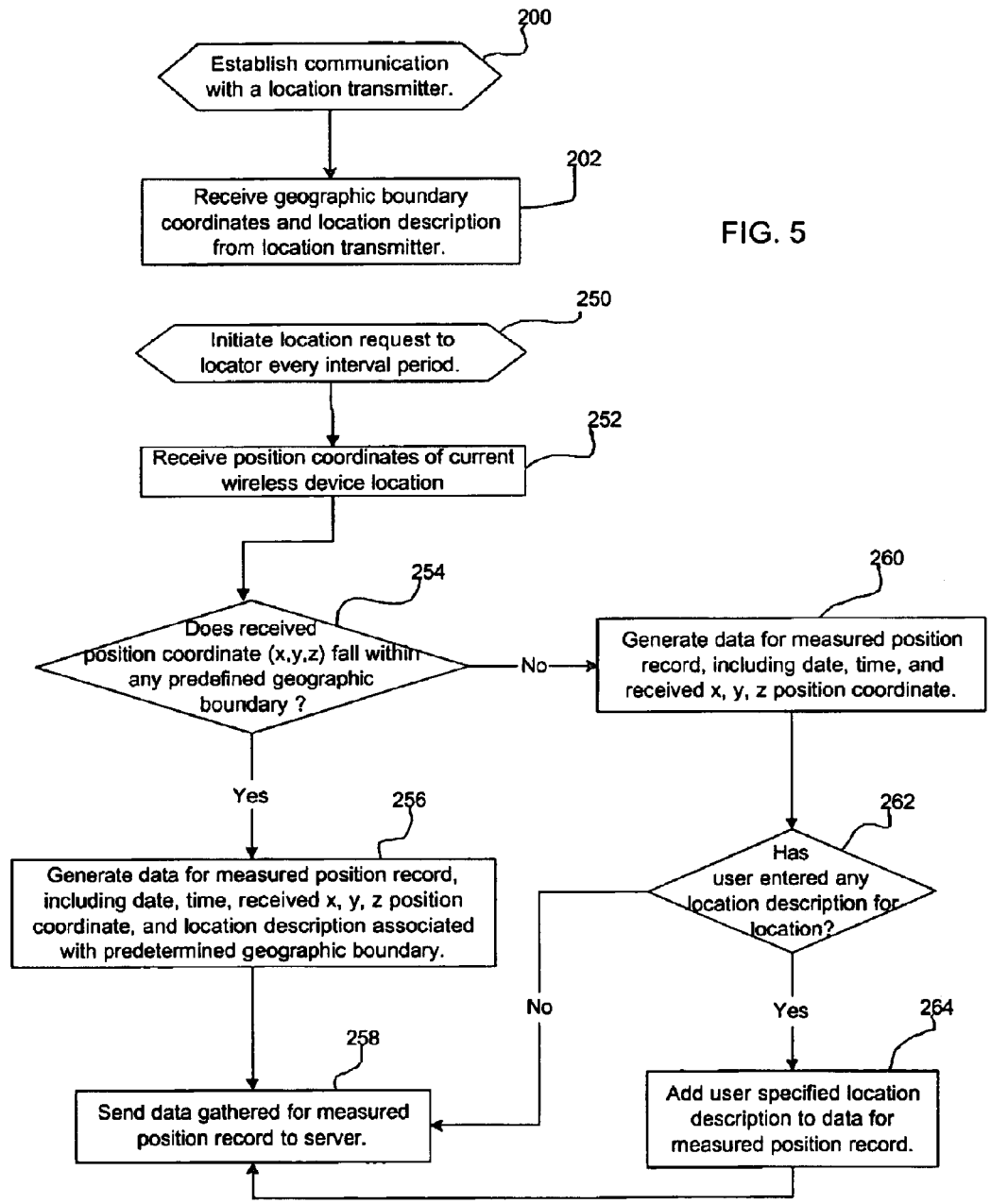
FIGS. 5, 6, and 7 illustrate flowcharts of code logic to gather, process, and use location information in accordance with implementations of the present invention.
Figure 6:
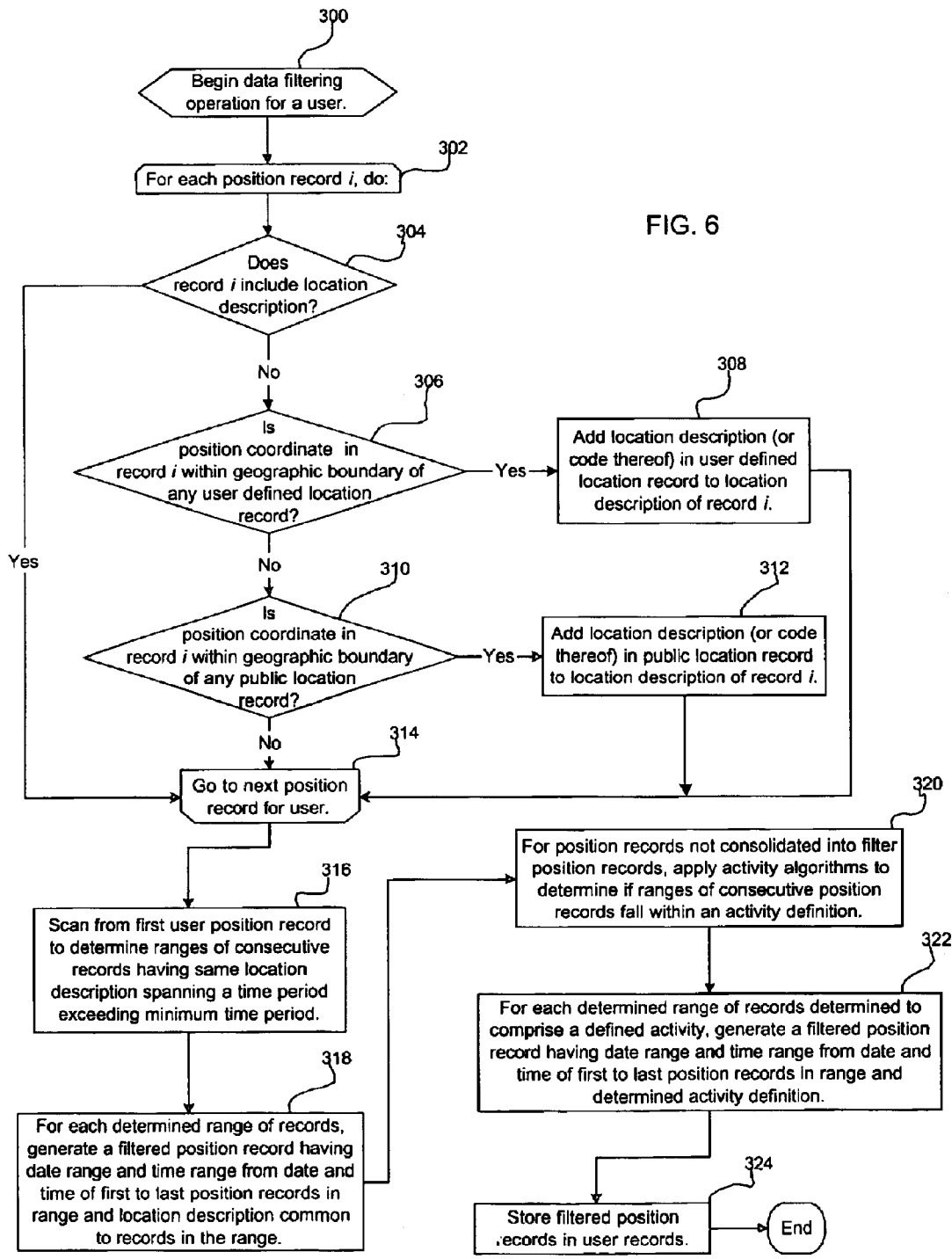
Figure 7:
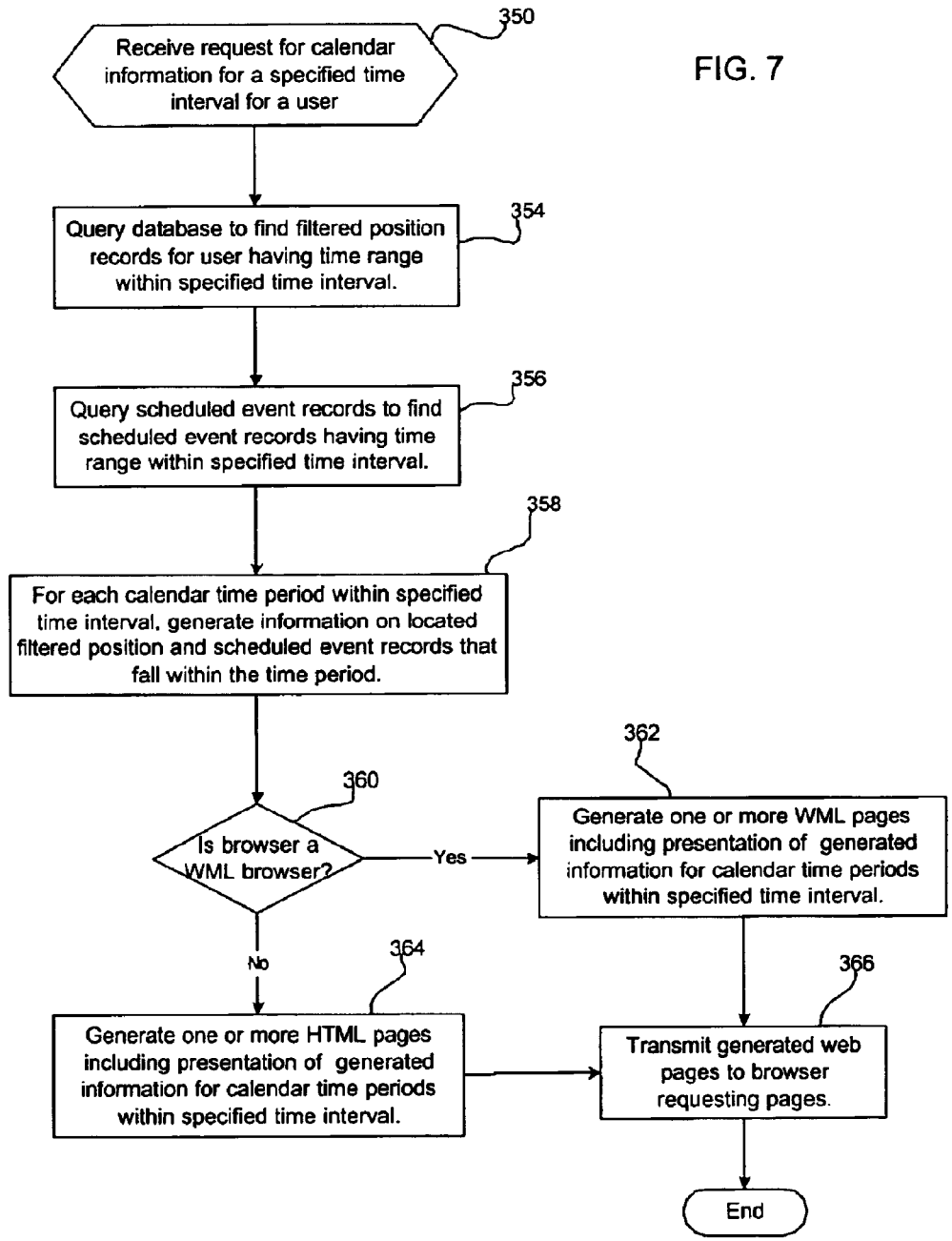

FIGS. 5–7 illustrate logic implemented in the PIM client 20 and server 24 to gather and utilize position information concerning the wireless device 2. FIG. 5 illustrates logic implemented in the PIM client 20 to gather position information to provide to the PIM server 24 to include within measured position records 54 in the database 22. At block 200, the wireless device 2 establishes communication with a location transmitter 110, using the Bluetooth technology or other wireless technology known in the art. After establishing a connection with the location transmitter 110, the PIM client receives (at block 202) a geographic boundary 116 comprised of X, Y, Z coordinates defining a three dimensional boundary on earth and location information describing the geographic boundary 116.

To provide data to the PIM server 24, the PIM client 20 performs steps 250 through 264 in interval time periods, e.g., every few seconds, minute, etc., to measure the current location and generate measured position records 54. At block 250, the PIM client 20 initiates a location request to the locator 14 or other unit to determine the current position coordinate (x, y, z) of the wireless device 2. Upon receiving (at block 252) the position coordinate from the locator 14, the PIM client 20 determines (at block 254) whether the received position coordinate falls within any predefined geographic boundaries supplied by a location transmitter 110, the PIM server 24, a user defined location record 56, or any other geographical boundary maintained by the PIM client 20. If so, the PIM client 20 generates (at block 256) data for a measured position record 54, including the received position coordinate, the date and time the coordinate was determined, and any location description associated with the predefined geographic boundary including the received position coordinate. The gathered data is then sent (at block 258) to the PIM server 24 to include as a position record 54 in the user records 50.

If (at block 254) the received position coordinate did not fall within any predefined geographic boundary, then the PIM client 20 generates (at block 260) data for a measured position record 54 including the received X, Y, Z position coordinate and the date and time the coordinate was measured. If (at block 262) the user has entered through the input mechanism 16 any location description for the current location through the input mechanism 16, then the PIM client 20 adds (at block 264) the user specified location description to the data for the measured position record. From block 264 or the no branch of block 262, the PIM client 20 transmits the data for the measured position record 54 to the PIM server 24 to include in the user records 50.

FIG. 5 provides logic implemented in the PIM client 20 to gather the position records for each measured coordinate. FIG. 6 illustrates logic for a filtering algorithm that consolidates and interprets the measured position records 54 and generates filtered position records 60 that provide information on the user's whereabouts and activities for time periods. The filtering algorithms used to generate the filtered position records 60 may be implemented in either the PIM client 20 or PIM server 24. In the event that the PIM client 20 executes the filtering algorithm, then the PIM client 20 would transmit the filtered position records 60 to the PIM server 54 to store in the PIM database 22.

With respect to FIG. 6, control begins at block 300 with the invocation of the filtering algorithm for the user records 50 of a particular user. A loop is performed from blocks 302 to 314 for each measured position record i in the user records 50 that has not yet been subject to filtering to add location description information 86 to the measured position record 64 if such data was not provided by the PIM client 20. If (at block 304) the measured position record i does not include any location description 86 data, then a determination is made (at block 306) as to whether the position coordinate 84 data in record i is within the geographic boundary of any user defined location records 56 of the user being considered. If so, then the location description 94 for the user defined location record 90 is added (at block 308) to the location description 86 data for the measured position record 64. If (at block 306) a geographic boundary was not located in the user defined location records 56, then a determination is made (at block 310) whether the position coordinate 84 data in record i is within the geographic boundary of any public location records 58. If so, then the location description 94 for the public location record 58 is added (at block 312) to the location description 86 data for the measured position record 64. From the yes branch of block 304 (if there is already location information added by the PIM client 20) or from blocks 308 or 312, control proceeds to block 314 to consider all the measured position records 54 for the user.

After the measured position records 64 are supplemented with location information from user defined 56 or public 58 location records, then control proceeds to blocks 316 to generate the filtered position records 60 that are particularly suited for use in a PIM or calendaring program. At block 316, the filter scans from the first user position record 54 to determine ranges of consecutive position records 54 having the same location description 86 spanning a time period exceeding a minimum time period. Thus, the filter is looking for position records indicating that the user was at a same location for a minimum time. The minimum time may be a time period of sufficient length that would be meaningful to display in a PIM interface, such as a calendar or schedule, e.g., 10 minutes, etc. For each determined range of records, a filtered position record 60 is generated (at block 318) having a date 100 and time 102 ranges from the date and time of the first to last position records in the determined range and having a location description 106 that is the common location description 86 found in the position records 54 in the determined range. In this way, a single filter position record 50 is generated that defines a location position that was maintained for a minimum time.

At block 320, activity algorithms may then be applied to those position records not consolidated into filtered position records 58 at block 316 and 318. An activity algorithm would analyze a series of consecutive measured position records and based on a rate of change in distance per unit of time, determine a predefined activity associated with the position records. For instance, a range of consecutive measured position records 54 whose position coordinate 84 (x, y, z) is rapidly changing may indicate that the user is traveling in an automobile or other transportation vehicle. Other rate of changes may indicate other activities, e.g., walking, running, bicycle riding, etc. For each determined range of measured position records 54 that define an activity, a filtered position record 60 is generated (at block 322) having a date 100 and time 102 ranges from the date 80 and time 82 of the first and last measured position records 54 in the range and an activity description field 106 set to the activity determined for the range. The geographic location field 104 may comprise a range of first and last locations for the activity, wherein the first location would comprise the location 84 data from the first measured position record 64 in the range for the activity and the last location would comprise the location data 84 from the last record 84 in the range. Thus, in certain described implementations, a filtered position record 60 indicates a time period during which a user was at a location, defined by a geographic boundary or a time period during which the user was engaged in an activity involving movement from one location to another.

The filtered position records 60 are then stored (at block 324) in the PIM database 22 for later use. The filtered position records 60 provide more useful descriptive information than the measured position records 54 because they indicate time periods spent at meaningful geographic locations or engagement in a particular activity.

FIG. 7 illustrates logic implemented in the PIM server 24 to generate calendar information that can be displayed at the wireless device 2 or some other computer in communication with the server 4, such as a desktop computer accessing the server 4 over the Internet. Control begins at block 350 with a request for PIM information for a time interval for a user. In response, the PIM server 24 queries the PIM database 22 for filtered position records 60 (at block 354) and scheduled event records 52 (at block 356) of the user within the specified time interval. The PIM server 24 then generates (at block 358) for each calendar time period, e.g., every half-hour, hour, etc., information on the scheduled event description 74 and the location/activity description 106 (FIGS. 3a, d) in the located scheduled event 52 and filtered position 58 records, respectively, that fall within the calendar time periods that span the specified time interval.

If (at block 360) the viewer program requesting the calendar information for the time period is a WML browser on a small device, e.g., the wireless device 2, then the PIM server 24 generates (at block 362) one or more WML pages including a presentation of the information generated for each calendar time period in the user specified time interval including information on user scheduled events and actual location/activity. Otherwise, if the viewer or browser requesting the calendar information includes a larger display area, then the PIM server 24 generates (at block 364) one or more HTML pages including the presentation of the generated calendar information. From blocks 362 or 364, control transfers to block 366 to transmit the generated web pages to the browser requesting that page. Alternatively, the PIM server 24 may include the generated calendar information in an Extensible Markup Language (XML) or other file that is sent to the PIM client 20 to render on the local display. Thus, the calendar information presented to the user may include a description of user scheduled events as well as information on the geographical locations the user associated with the wireless device 2 visited during the specified time interval.

FIG. 8 illustrates an example of calendar information for the user specified time period presented in a calendar window 400 rendered on a computer display monitor. As shown, the calendar displays both user scheduled events 402 from the scheduled event records and actual location/activity 404 from the filtered position records for calendar times 406 during the specified time interval. In this way, the user may compare what was scheduled with what actually materialized. Moreover, in implementations where the PIM server 24 updates the user calender information in real time and generates real time filtered position records, the calendar 400 could display the user's current geographical location. This information could be useful for business associates and others interested in the user's location Additionally, the actual location/activity 402 may be displayed in an abbreviated format. The user may use an input device to selectively display further details on the actual location/activity. For instance, the user may move a mouse input device over the displayed abbreviation of the actual location/activity or click the displayed abbreviation to cause the display of more detailed information on the actual location/activity in the calendar window 400.

Figure 9A:
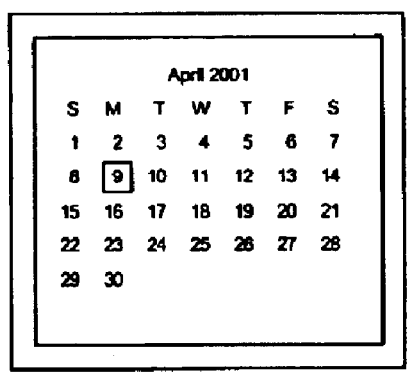
Figure 9B:
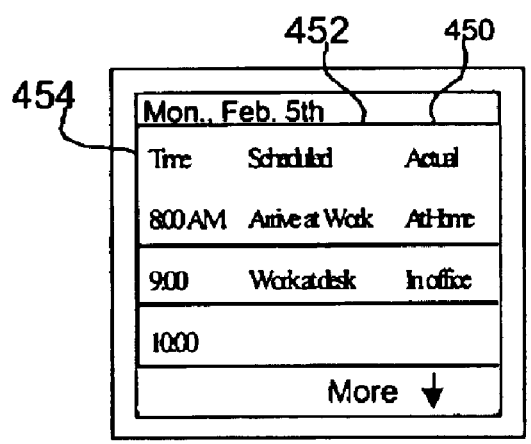

FIGS. 9a, b illustrate how calendar information may be displayed on a display 18 of a wireless device 2 having limited display space. FIG. 9a illustrates a small displayed monthly calendar. Upon user selection through the input mechanism 18 of a particular day, e.g., February $5^{th}$, the PIM client 20 displays the view shown in FIG. 9b which provides information of scheduled events 450 and actual user location/activity 452 for a portion of the calendar times 454 during the user requested time interval. The user can use the input mechanism 18 to scroll downward to view further calendar entries.

The described implementations provide a technique for gathering and utilizing user position information for use with a PIM or calendaring program. This position information may be provided to the user and those authorized by the user to track actual activity versus scheduled activity.

Obtaining Location Information from Proximate Users

In the above described implementations, location description 86 information to include with the user's measured position records 54 could be obtained from user defined 56 and public 58 location records and from a location transmitter 110. Additionally, location description 86 information and location records may be obtained from the location records or position records 54, 60 of other users that were in proximity to the wireless device 2 when the position coordinate 84 for the record 54 was generated.

To use the location description 86 information of other proximate users to a measured position record 54, the PIM client 20 or server 24 must first determine all those other user wireless devices 2 that are within a predefined proximity, e.g., fifty feet, etc, of the position coordinate 84 in the record 54 to which the location description 86 will be added. In one implementation, the PIM client 20 would gather the identity of other transmitting devices, which may comprise other wireless devices 2 (FIG. 1) and location transmitters 110 (FIG. 4), that are in a predefined proximity to the wireless device 2.

Figure 10:
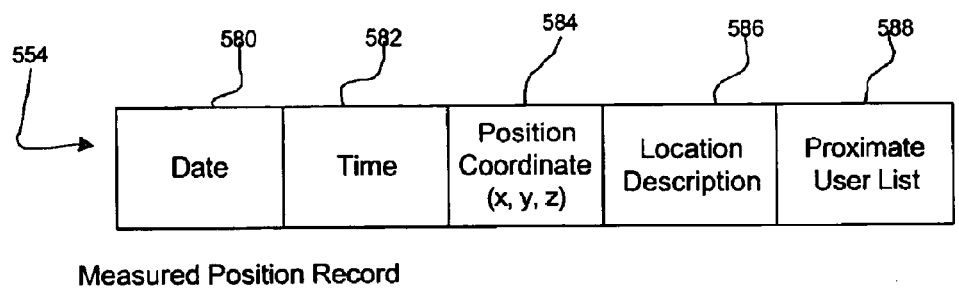
FIG. 10 illustrates a data structure including information on proximate users in accordance with implementations of the invention.

FIG. 10 illustrates a modified measured position record 554 that includes date 580, time 582, position coordinate 584, and location description 586 fields which are similar to the fields 80, 82, 84, and 86, respectively, described with respect to the measured position record 54 shown in FIG. 3b. In addition, measured position record 554 includes a proximate user list field 588 that includes the unique identifier of one or more proximate transmitting devices, e.g., other proximate wireless devices 2 and local transmitters 110. There may be a limit on the number of users that are included in the proximate user list field 588 to prevent overloading, such as the case if the user is at a public event or arena surrounded by numerous wireless device 2 users.

Figure 11:
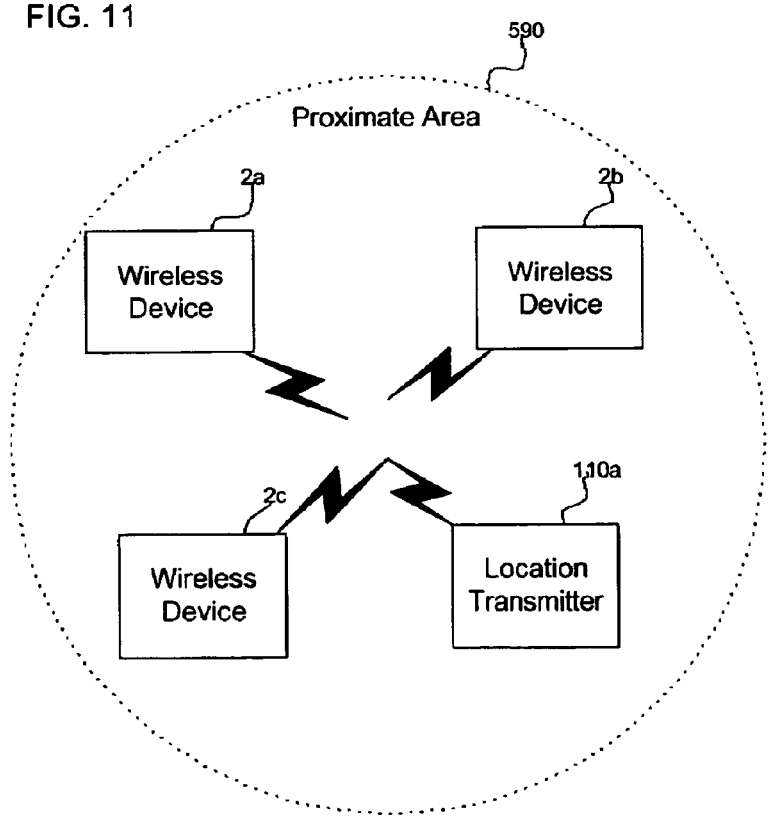
FIG. 11 illustrates details of a telecommunication environment in which further aspects of the invention are implemented.

FIG. 11 illustrates one implementation for exchanging identification information among wireless devices 2a, b, c, including the components of wireless device 2 in FIG. 1, and location transmitter 110a, including the components of location transmitter 110 in FIG. 4, within a proximate transmitting area 590. In one implementation, the communication layer of the wireless devices 2a, b, c may allow for transmittal of identification information to all other wireless devices 2a, b, c and location transmitters 110a within the proximate area 590. For instance, in Bluetooth implementations, the communication layers of the wireless devices 2a, b, c and location transmitter 110a may continually transmit packets containing an Inquiry Access Code (IAC) to establish communication with any other wireless device 2a, b, c and location transmitter 110a within the proximate area 590 of the transmission. The wireless devices 2a, b, c and location transmitter 110a receiving one of the packets may then respond to establish a connection communication with the transmitting wireless device 2a, b, c or location transmitter 110a transmitting the packets. Upon establishing a connection, the transmitting devices, e.g., wireless devices 2a, b, c and location transmitter 110a, may then transmit identification information to all other connected transmitting devices in the proximate area 590. Each wireless device 2a, b, c and location transmitter 110a receiving such identification information would then add the identification information to the proximate user list 588 in a measured position record 554 being generated. In the described implementation, the PIM database 22 may maintain measured position records 554 and filtered position records 60 for location transmitters 110 to allow calendars to be generated for location transmitters 110 providing calendar information for the location associated with the location transmitter 110, e.g., the building, room, vehicle, etc.

Figure 12:
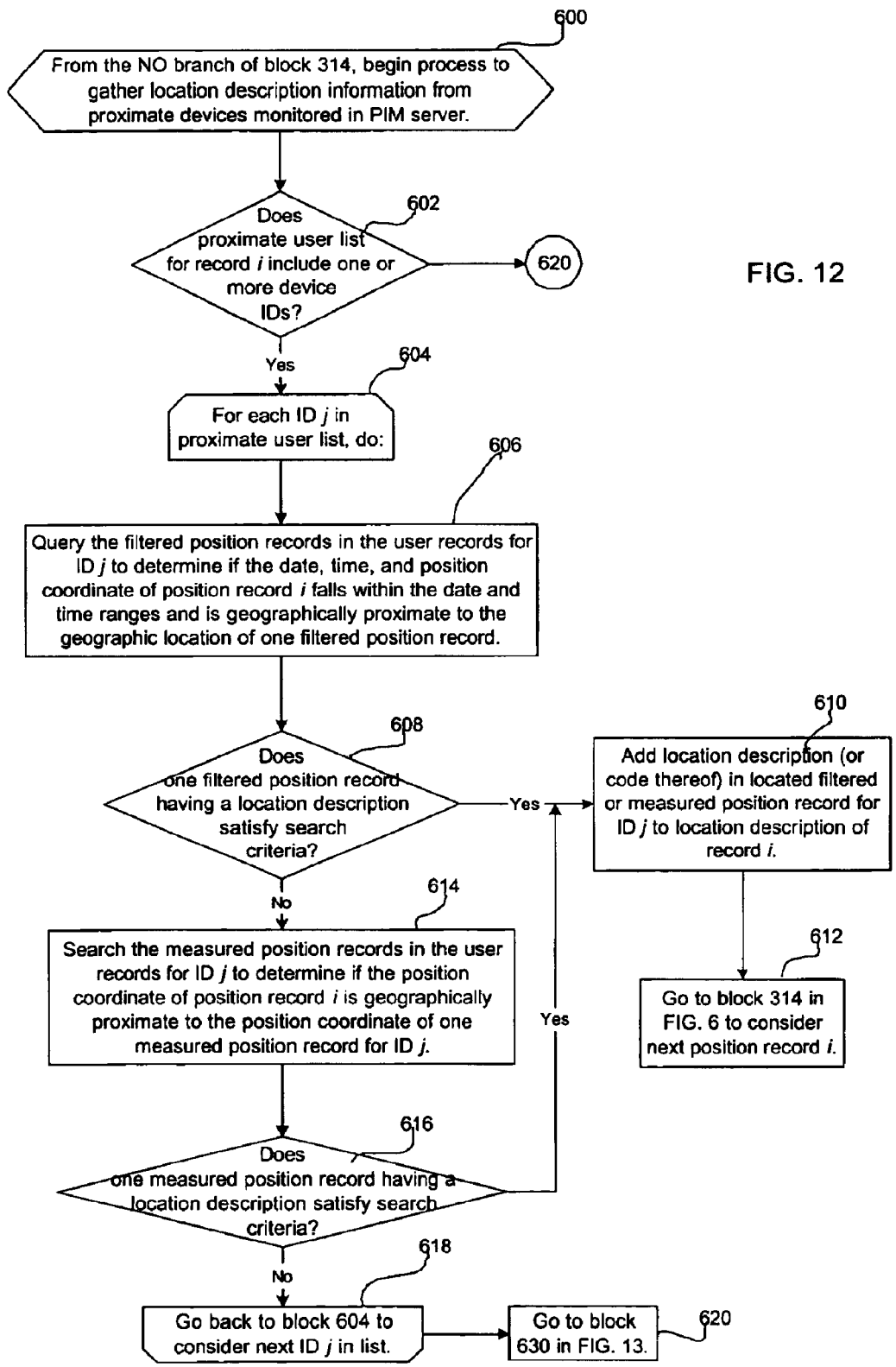
FIGS. 12 and 13 illustrate logic to gather and utilize information on proximate users in accordance with implementations of the invention.
Figure 13:
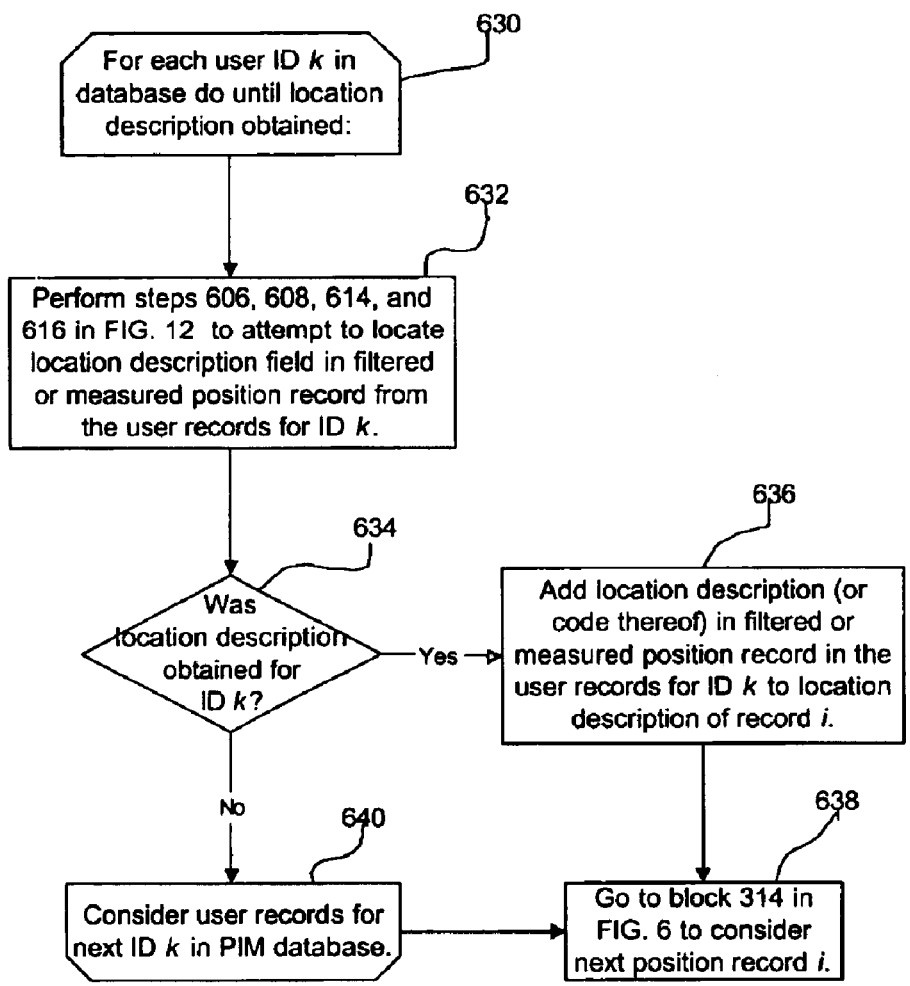

The PIM server 24 could utilize the information of proximate users to gather location description 86 information for a position record 54. FIGS. 12 and 13 illustrate additional logic that the PIM server 24 would perform from the NO branch of block 310 in FIG. 6 to gather location description 586 information from proximate transmitting devices in the event that location description information could not be obtained from the user defined 56 and public 58 location records at blocks 306 and 310, respectively. Additionally, the PIM server 24 may gather location description information from proximate transmitting devices to supplement the information provided in the location records 56, 58 in the user records 52.

With respect to FIG. 12, control begins at block 600 from the NO branch of block 314 in FIG. 6 where the PIM server 24 begins to gather location description information for record i from proximate transmitting devices monitored by the PIM server 24, i.e., those transmitting devices for which user records 52 (FIG. 2) are maintained in the PIM database 22 (FIG. 1). If (at block 602) the proximate user list 588 for position record i 554 includes one or more transmitting device IDs, where such transmitting devices may comprise wireless devices 2a, b, c or location transmitters 110a, then the PIM server 24 performs a loop at blocks 604 through 618 for each transmitting device ID j in the proximate user list 588 of measured position record i 554. A transmitting device ID comprises a unique identifier of the transmitting device in the PIM database 22. Thus, all user records 20 for each user or transmitting device have a unique ID. Within this loop, at block 606, the PIM server 24 queries the filtered position records 60 in the user records 50 for ID j to determine if the date 580, time 582, and position coordinate 584 of measured position record i 554 falls within the date 100 and time 102 ranges and is geographically proximate to the geographic location 104 of one filtered position record 60 for device ID j. If (at block 608) one filtered position record 60 for ID j having a location description 86 value satisfies the query, then the location description 106 (FIG. 3d) for the qualifying filtered position record 60 for ID j is added (at block 610) to the location description field 586 of the measured position record i. If multiple filtered position records 60 for ID j satisfy the query, then, in certain implementations, only the first located filtered position record 60 is used or multiple location descriptions from multiple qualifying filtered position records may be added to the location description for record i. From block 610, control proceeds (at block 612) back to block 314 in FIG. 6 to process the next measured position record i.

If (at block 608) no filtered position record 60 satisfies the query, then the PIM server 24 determines (at block 614) whether the user records 50 for ID j includes a measured position record 554 that has a position coordinate value 84 that is proximate to the position coordinate value 584 of position record i. If (at block 616) one measured position record 554 for ID j having a location description satisfies the query, then control proceeds to block 610 to add the location description 586 for the position record 554 for ID j to the location description field 586 for record i. If (at block 616) the measured 554 and filtered 60 position records for ID j do not provide a location description, then control proceeds (at block 618) back to block 604 to consider the ID for a next proximate device in the proximate user list 588. If (at block 618) all the proximate IDs in the proximate user list 588 were queried without finding a location description 586 or if (at block 602) the proximate user list 588 is empty, then control proceeds (at block 620) to block 630 in FIG. 13 to further search the PIM database 22 (FIG. 1) for other user records 50 (FIG. 2) that may supply a location description.

Blocks 630 through 640 comprise a loop that the PIM server 24 performs for all user records in the PIM database 22 until a location description is found, in which case the loop is exited. The PIM server 24 may exclude the user records for the IDs in the proximate user list 588 considered during execution of the logic of FIG. 12. For the user records 50 of the transmitting device having ID k, at block 632, the PIM server 22 performs the steps at blocks 606, 608, 614, and 616 in FIG. 12 to find a location description satisfying the query from the filtered 60 or measured 554 position records in the user records 50 for ID k. If (at block 634) a location description was found, then the PIM server 24 adds (at block 636) the location description discovered in the user records 50 of ID k to the location description 586 field for record i. Once the location description field 586 of record i is updated or if (at block 64) no location description is found in the user records 50 of any of the transmitting devices in the PIM database 22, then control proceeds (at block 638) to block 314 in FIG. 6 to consider the next measured position record i having an empty location description field 86.

With the logic of FIGS. 12 and 13, the PIM server 12 searches the user records of transmitting devices the wireless device 2 recorded as proximate in the proximate user list 588. By searching the filtered position records of proximate transmitting devices, the PIM server 12 is effectively checking the calendar data for the proximate transmitting devices to determine if such calendar data provides detailed location description information that would be useful to include in the measure position record 554 for the wireless device 2. As discussed, the filtered position records 60 are used to construct the calendar entries in a user calendar, shown as displayed in FIGS. 8 and 9a, b. If the filtered position records 60 do not supply location description information, then the measured position records 554, which comprise the underlying data behind the filtered position records 60, for proximate transmitting devices identified in the list 558 may be searched. In this way, the location description information in their user records 50 for one transmitting device can be supplemented with location description information gathered by other transmitting devices in the vicinity when the data for the measured position record 554 was generated.

Additionally, the PIM server 24 may also search the user defined 56 and public 58 location records for each user in the proximate user list 588 to determine if any of the location records 56 or 58 provides a geographic boundary 92 (FIG. 3c) proximate to the position coordinate 584 of record i. If such a location record 56 or 58 for the proximate transmitting device is identified, then the location description 94 with such location record 56 or 58 may be added to the location description field 586 of record i.

In further implementations, if the proximate transmitting devices provide multiple location descriptions, then the PIM server 24 may combine the location descriptions or may select the location description deemed to provide the most information. In this way, the entire PIM database 22 is leveraged to provide robust location description information to the user records 50 to provide the most meaningful data to users of the system concerning their location.

Additional Implementation Details

The described aspects of the invention, including the logic described with respect to the PIM client and server and any other devices, may be implemented as a method, apparatus or article of manufacture using standard programming and/ or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and nonvolatile memory devices (e.g., EEPROMs, ROMs, PROMs, RAMs, DRAMs, SRAMs, firmware, programmable logic, etc.). Code in the computer readable medium is accessed and executed by a processor. The code in which the invention is implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described implementations, the wireless device obtain the position coordinates and time and date information and transmits the data to the server 4. In alternative implementations, telecommunication devices or towers can detect the location of the wireless device and transmit the data for the measured position record 54 directly to the server 4. In such implementations, the wireless device would not be involved in transmitting position coordinates for the measured position records.

The described implementations concerned maintaining user location information with a user calendar program. The described implementations can further be used to provide and utilize a persons geographic location and/or activities for a measured time period for any purpose, not just calendering. For instance, a company may want to track the location and activity of workers. The company can then filter and compare a workers actual location/activity with their work schedule. Such information would be particularly useful for manufacturers and others attempting to determine optimal human resource allocation in the workplace.

The PIM location/activity information of the described implementations would also be very useful for companies that have to send workers out to field locations, such as cable companies, telephone companies, plumbers, etc., to track how the worker's actual location/activities correspond to those scheduled. In the case that real time worker location/ activity information is provided to the calendar display, then the company can track the workers schedule and their actual geographic location in real time. Moreover, because descriptive geographic information is provided, a quick review of the calendar information can provide useful information on the workers geographic location, such as their presence in a particular building. Moreover, to the extent location records define the geographic boundaries of major roadways and freeways, a manager could review a field workers real time calendar, which could display that the worker is presently driving on a roadway. The activity algorithm can specify the rate the worker is traveling, i.e., indicating stuck in traffic, etc.

In the described implementations, scheduled events and location/activity information were displayed together in a user calendar view. Alternatively, the calendar view may selectively display only scheduled events or location/ activity information.

The described implementations presented the scheduled event and location/activity information at different times during a user specified time interval. However, the generated location/activity information may be presented in alternative formats. For instance, the user may generate a display of all locations visited and activities, and the time period during which the location was visited or activity performed would be displayed under the location/activity display.

FIGS. 3a, b, c, d illustrate one implementation of the data structures used to maintain the information used in the described implementations. However, those skilled in the art will recognize that the there are numerous ways the data shown in FIGS. 3a, b, c, d may be organized in data structures and a database for storage and retrieval.

In the described implementations, the PIM server 24 transmitted the PIM information to the client PIM 20 or some other client to display in a browser, such as a WML or HTML browser. In alternative implementations, the PIM server 24 may provide the generated PIM information in alternative presentation and file formats, or alternative text markup languages than those described herein. Moreover, the location information presented to the user through the browser may present information in alternative presentation formats, such as audio, movies, etc. For instance, the calendar may display a hypertext description of the visited location. User selection of the hypertext description could present a movie or audio file about the visited location.

Still further, the user, through the wireless device 2 or some other computer may provide images or audio files taken from a location to associate with measured position records. In certain implementations, the wireless device 2 could include a microphone, still image camera, video camera etc. The user could then associate such multi-media files image information with the location that the PIM client 20 would provide with the measured position records 54 sent to the PIM server 24. This information would be made available to those viewing the calendar providing the location/activity information.

In the described implementation, the generated location was expressed as an x, y, z position coordinate. However, as discussed, the position coordinate may be expressed as any set of numbers used in specifying a location in space, or may comprise a code or descriptor defining a location in space.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for providing user location information for a personal information management program, comprising:

providing a plurality of user records for a user of a wireless device, wherein each user record includes at least one position coordinate and an associated time indicating a location of the wireless device at the time and the position coordinate;

providing records for transmitting devices, wherein each transmitting device record includes at least one position coordinate and an associated location description providing information on the position coordinate of the transmitting device;

determining one transmitting device record including one position coordinate that is within a proximity to one position coordinate in one user record; and adding the location description from the determined transmitting device record to at least one user record having one position coordinate within the proximity to the position coordinate of the determined transmitting device record.

2. The method of claim 1, wherein the transmitting devices comprise wireless devices associated with other users and fixed location transmitters associated with a location providing information on the location.

3. The method of claim 1, wherein the user records further include a list identifying one or more transmitting devices within the proximity to the wireless device of the user.

4. The method of claim 1, wherein the transmitting device records further provide a time associated with the position coordinate indicating a time the transmitting device was located at the position coordinate.

5. A method for providing user location information for a personal information management program, comprising:

providing a plurality of user records for a user of a wireless device, wherein each user record includes at least one position coordinate and an associated time indicating a location at the wireless device at the time and the position coordinate;

providing records for transmitting devices, wherein each transmitting device record includes at least one position coordinate and an associated location description providing information on the position coordinate of the transmitting device; and adding the location description from at least one of the transmitting device records to at least one user record associated with the user of the wireless device, wherein the user records further include a list identifying one or more transmitting devices within a proximity to the wireless device of the user, and wherein the added location description is from one transmitting device record for one transmitting device identified in the list.

6. The method of claim 5, further comprising:

determining one record for one of the transmitting devices identified in the list including one position coordinate within a proximity to one position coordinate of one user record, wherein the location description from the determined transmitting device record is added to the user record having the position coordinate within the proximity to the position coordinate of the determined transmitting device record.

7. A method for providing user location information for a personal information management program, comprising:

providing a plurality of user records for a user of a wireless device, wherein each user record includes at least one position coordinate and an associated time indicating a location of the wireless device at the time and the position coordinate;

providing records for transmitting devices, wherein each transmitting device record includes at least one position coordinate and an associated location description providing information on the position coordinate of the transmitting device; and adding the location description from at least one of the transmitting device records to at least one user record associated with the user of the wireless device, wherein the user records further include a list identifying one or more transmitting devices within a proximity to the wireless device of the user;

receiving, with the user wireless device, wireless transmissions from proximate transmitting devices, wherein each wireless transmission identifies one transmitting device; and adding to the list each transmitting device identified in each wireless transmission.

8. The method of claim 7, wherein the transmitting devices identified in the list are in the proximity of the position coordinate in the user record including the list.

9. A method for providing user location information for a personal information management program, comprising:

providing a plurality of user records for a user of a wireless device, wherein each user record includes at least one position coordinate and an associated time indicating a location of the wireless device at the time and the position coordinate;

providing records for transmitting devices, wherein each transmitting device record includes at least one position coordinate and an associated location description providing information on the position coordinate of the transmitting device;

searching a database of transmitting device records to determine one transmitting device record including one position coordinate within a proximity to the position coordinate in one user record; and adding the location description from at least one of the transmitting device records to at least one user record having one position coordinate within the proximity to the position coordinate of the determined transmitting device record.

10. A method for providing user location information for a personal information management program, comprising:

providing a plurality of user records for a user of a wireless device, wherein each user record includes at least one position coordinate and an associated time indicating location of the wireless device at the time and the position coordinate;

providing records for transmitting devices, wherein each transmitting device record includes at least one position coordinate and an associated location description providing information on the position coordinate of the transmitting device, wherein at least one transmitting device record indicates a location boundary defining multiple position coordinates, wherein the location description in the transmitting device record provides information on the location boundary; and adding the location description from at least one of the transmitting device records to at least one user record associated with the user of the wireless device.

11. A method for providing user location information for a personal information management program, comprising:

providing a plurality of user records for a user of a wireless device, wherein each user record includes at least one position coordinate and an associated time indicating a location of the wireless device at the time and the position coordinate;

providing records for transmitting devices, wherein each transmitting device record includes at least one position coordinate and an associated location description providing information on the position coordinate of the transmitting device, wherein the location description added from the transmitting device record to the record associated with the user includes a multimedia file providing information in a multimedia format on the location; and adding the location description from at least one of the transmitting device records to at least one user record associated with the user of the wireless device.

12. A system for providing user location information for a personal information management program, comprising:

means for providing a plurality of user records for a user of a wireless device, wherein each user record includes at least one position coordinate and an associated time indicating a location of the wireless device at the time and the position coordinate;

means for determining one transmitting device record including one position coordinate that is within a proximity to one position coordinate in one user record;

means for providing records for transmitting devices, wherein each transmitting device record includes at least one position coordinate and an associated location description providing information on the position coordinate of the transmitting device; and means for adding the location description from the determined transmitting device record to at least one user record having the position coordinate within the proximity to the position coordinate of the determined transmitting device record.

13. The system of claim 12, wherein the transmitting devices comprise wireless devices associated with other users and fixed location transmitters associated with a location providing information on the location.

14. The system of claim 12, wherein the user records further include a list identifying one or more transmitting devices within the proximity to the wireless device of the user.

15. The system of claim 12, further comprising means for providing a time in the transmitting device records associated with the position coordinate indicating a time the transmitting device was located at the position coordinate.

16. A system for providing user location information for a personal information management program, comprising:

means for providing a plurality of user records for a user of a wireless device, wherein each user record includes at least one position coordinate and an associated time indicating a location of the wireless device at the time and the position coordinate;

means for providing records for transmitting devices, wherein each transmitting device record includes at least one position coordinate and an associated location description providing information on the position coordinate of the transmitting device; and means for adding the location description from at least one of the transmitting device record to at least one user record associated with the user of the wireless device, wherein the user records further include a list identifying one or more transmitting devices within a proximity to the wireless device of the user, and wherein the added location description is from one transmitting device record for one transmitting device identified in the list.

17. The system of claim 16, further comprising:

means for determining one record for one of the transmitting devices identified in the list including one position coordinate within the proximity to one position coordinate of one user record, wherein the location description from the determined transmitting device record is added to the user record having the position coordinate within the proximity to the position coordinate of the determined transmitting device record.

18. A system for providing user location information for a personal information management program, comprising:

means for providing a plurality of user records for a user of a wireless device, wherein each user record includes at least one position coordinate and an associated time indicating a location of the wireless device at the time and the position coordinate;

means for providing records for transmitting devices, wherein each transmitting device record includes at least one position coordinate and an associated location description providing information on the position coordinate of the transmitting device; and means for adding the location description from at least one of the transmitting device records to at least one user record associated with the user of the wireless device, wherein the user records further include a list identifying one or more transmitting devices within a proximity to the wireless device of the user;

means for receiving, implemented within the user wireless device, wireless transmissions from proximate transmitting devices, wherein each wireless transmission identifies one transmitting device; and means for adding to the list each transmitting device identified in each wireless transmission.

19. The system of claim 18, wherein the transmitting devices identified in the list are in the proximity of the position coordinate in the user record including the list.

20. A system for providing user location information for a personal information management program, comprising:

means for providing plurality of user record for a user of a wireless device, wherein each user record includes at least one position coordinate and an associated time indicating a location of the wireless device at the time and the position coordinate;

means for providing records for transmitting devices, wherein each transmitting device record includes at least one position coordinate and an associated location description providing information on the position coordinate of the transmitting device;

means for searching a database of transmitting device records to determine one transmitting device record including one position coordinate within a proximity to the position coordinate in one user record; and means for adding the location description from at least one of the transmitting device records to at least one user record having one position coordinate within the proximity to the position coordinate of the determined transmitting device record.

21. A system for providing user location information for a personal information management program, comprising:

means for providing a plurality of user records for a user of a wireless device, wherein each user record includes at least one position coordinate and an associated time indicating a location of the wireless device at the time and the position coordinate;

means for providing records for transmitting devices, wherein each transmitting device record includes at least one position coordinate and an associated location description providing information on the position coordinate of the transmitting device, wherein at least one transmitting device record indicates a location boundary defining multiple position coordinates, wherein the location description in the transmitting device record provides information on the location boundary; and means for adding the location description from at least of the of the transmitting device records to at least one user record associated with the user of the wireless device.

22. A system for providing user location information for a personal information management program, comprising:

means for providing a plurality of user records for a user of a wireless device, wherein each user record includes at least one position coordinate and an associated time indicating a location of the wireless device at the time and the position coordinate;

means for providing records for transmitting devices, wherein each transmitting device record includes at least one position coordinate end an associated location description providing information on the position coordinate of the transmitting device, wherein the location description added from the transmitting device record to the record associated with the user includes a multimedia file providing information in a multimedia format on the location; and means for adding the location description from at least one of the transmitting device records to at least one user record associated with the user of the wireless device.

23. An article of manufacture comprising code for providing user location information for a personal information management program by:

providing a plurality of user records for a user of a wireless device, wherein each user record includes at least one position coordinate and an associated time indicating a location of the wireless device at the time and the position coordinate;

providing records for transmitting device, wherein each transmitting device record includes at least one position coordinate and an associated location description providing information on the position coordinate of the transmitting device;

determining one transmitting device record including one position coordinate that is within a proximity to one position coordinate in one user record; and adding the location description from determined transmitting device record to at least one user record having one position coordinate within the proximity to the position coordinate of the determined transmitting device record.

24. The article of manufacture of claim 23, wherein the transmitting devices comprise wireless devices associated with other users and fixed location transmitters associated with a location providing information on the location.

25. The article of manufacture of claim 23, wherein the user records further include a list identifying one or more transmitting devices within a proximity to the wireless device of the user.

26. The article of manufacture of claim 23, wherein the transmitting device records further provide a time associated with the position coordinate indicating a time the transmitting device was located at the position coordinate.

27. An article of manufacture comprising code for providing user location information for personal information management program by:

providing plurality of user records for a user of a wireless device, wherein each user record includes at least one position coordinate and an associated time indicating alocation of the wireless device at the time and the position coordinate;

providing records for transmitting devices, wherein each transmitting device record includes at least one position coordinate and an associated location description providing information on the position coordinate of the transmitting device; and adding the location description from at least one of the transmitting device records to at least one user record associated with the user of the wireless device wherein the user records further include a list identifying one or more transmitting devices, within a proximity to the wireless device of the user, and wherein the added location description is from one transmitting device record for one transmitting device identified in the list.

28. The article of manufacture of claim 27, further comprising:

determining one record for one of the transmitting devices identified in the list including one position coordinate within a proximity to one position coordinate of one user record, wherein the location description from the determined transmitting device record is added to the user record having the position coordinate within the proximity to the position coordinate of the determined transmitting device record.

29. An article of manufacture comprising code for providing user location information for a personal information management program by:

providing a plurality of user records for a user of a wireless device, wherein each user record includes at least one position coordinate and an associated time indicating a location of the wireless device at the time and the position coordinate;

providing records for transmitting devices, wherein each transmitting device record includes at least one position coordinate and an associated location description providing information on the position coordinate of the transmitting device; and adding the location description from at least one of the transmitting device records to at least one user record associated with the user of the wireless device, wherein the user records further include a list identifying one or more transmitting devices within a proximity to the wireless device of the user;

receiving, with the user wireless device, wireless transmissions from proximate transmitting devices, wherein each wireless transmission identifies one transmitting device; and adding to the list each transmitting device identified in each wireless transmission.

30. The article of manufacture of claim 29, wherein the transmitting devices identified in the list are in the proximity of the position coordinate in the user record including the list.

31. An article of manufacture comprising code for providing user location information for a personal information management program by:

providing a plurality of user records for a user of a wireless device, wherein each user record includes at least one position coordinate and an associated time indicating a location of the wireless device at the time and the position coordinate;

providing records for transmitting device, wherein each transmitting device record includes at least one position coordinate and an associated location description providing information on the position coordinate of the transmitting device;

searching a database of transmitting device records to determine one transmitting device record including one position coordinate within a proximity to the position coordinate in one user record; and adding the location description from at least one of the transmitting device records to at least one user record associated with the user of the wireless device having the one position coordinate within the proximity to the position coordinate of the determined transmitting device record.

32. An article of manufacture comprising code for providing user location information for a personal information management program by:

providing a plurality of user records for a user of a wireless device, wherein each user record includes at least one position coordinate and an associated time indicating a location of the wireless device at the time and the position coordinate;

providing records for transmitting devices, wherein each transmitting device record includes at least one position coordinate and an associated location description providing information on the position coordinate of the transmitting device, wherein at least one transmitting device record indicates a location boundary defining multiple position coordinates, wherein the location description in the transmitting device record provides information on the location boundary; and adding the location description from at least one of the transmitting device records to at least one user record associated with the user of the wireless device.

33. An article of manufacture comprising code for providing user location information for a personal information management program by:

providing a plurality of user records for a user of a wireless device, wherein each user record includes at least one position coordinate and an associated time indicating a location of the wireless device at the time and the position coordinate;

providing records for transmitting devices, wherein each transmitting device record includes at least one position coordinate and an associated location description providing information on the position coordinate of the transmitting device, wherein the location description added from the transmitting device record to the record associated with the user includes a multimedia file providing information in a multimedia format on the location; and adding the location description from at least one of the transmitting device records to at least one user record associated with the user of the wireless device.

* * * * *

UNITED STATES PATENT AND TRADEMARK OFFICE
CERTIFICATE OF CORRECTION

PATENT NO. : 6,873,851 B2  Page 1 of 1
APPLICATION NO. : 09/848173
DATED : March 29, 2005
INVENTOR(S) : Michael Wayne Brown, Rabindranath Dutta and Michael A. Paolini It is certified that error appears in the above-identified patent and that said Letters Patent is hereby corrected as shown below:

Column 16, line 25, delete "location at" and add -- location of -- .

Column 17, line 37, delete "indicating location" and add -- indicating a location -- .

Column 18, line 49, delete "record" and add -- records -- .

Column 19, line 28, delete "providing plurality" and add -- providing a plurality -- .
Line 28, delete "record" and add -- records -- .
Line 64-65, delete "least of the of the" and add -- least one of the-- .

Column 20, line 10, delete "end" and add -- and -- .
Line 38, delete "from determined" and add -- from the determined -- .
Line 56, delete "for personal" and add -- for a personal -- .
Line 58, delete "providing plurality" and add -- providing a plurality -- .
Line 61, delete "alocation" and add -- a location -- .

Column 21, line 3, delete "device wherein" and add -- device, wherein -- .
Line 5, delete "devices, within" and add -- devices within -- .
Line 58, delete "device" and add -- devices -- .

This certificate supersedes Certificate of Correction issued January 9, 2007.

Signed and Sealed this

Sixth Day of February, 2007

JON W. DUDAS
*Director of the United States Patent and Trademark Office*